United States Patent
Barthe et al.

(10) Patent No.: US 11,784,709 B2
(45) Date of Patent: Oct. 10, 2023

(54) METHOD AND RECEIVER DEVICE FOR DETECTING THE START OF A FRAME OF A SATELLITE COMMUNICATIONS SIGNAL

(71) Applicant: AIRBUS DEFENCE AND SPACE SAS, Toulouse (FR)

(72) Inventors: Lyonel Barthe, Toulouse (FR); Benjamin Gadat, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/919,187

(22) PCT Filed: Apr. 15, 2021

(86) PCT No.: PCT/FR2021/050659
§ 371 (c)(1),
(2) Date: Oct. 14, 2022

(87) PCT Pub. No.: WO2021/209719
PCT Pub. Date: Oct. 21, 2021

(65) Prior Publication Data
US 2023/0120948 A1 Apr. 20, 2023

(30) Foreign Application Priority Data
Apr. 16, 2020 (FR) .................... 2003838

(51) Int. Cl.
*H04B 7/185* (2006.01)
(52) U.S. Cl.
CPC .............. *H04B 7/18513* (2013.01)

(58) Field of Classification Search
CPC .......................... H04B 7/185–195
See application file for complete search history.

(56) References Cited

U.S. PATENT DOCUMENTS

| 2009/0037792 A1 | 2/2009 | Choi et al. |
| 2010/0138878 A1* | 6/2010 | Kim ............. H04N 7/20 375/150 |

(Continued)

FOREIGN PATENT DOCUMENTS

WO  WO-2008069512 A1 *  6/2008  ......... H04L 27/0014

OTHER PUBLICATIONS

International Search Report for PCT/FR2021/050659, dated Jul. 14, 2021, 4 pages.

(Continued)

*Primary Examiner* — Raymond S Dean
(74) *Attorney, Agent, or Firm* — Nixon & Vanderhye P.C.

(57) ABSTRACT

A method and a receiver device for detecting the start of a frame of a satellite communication signal. A shaping filtering is applied directly after sampling of the signal, before a frequency correction is applied. During a first phase, an approximate frequency error and a candidate first sample for the start of the frame are estimated by performing several correlations respectively associated with different frequency hypotheses. The samples obtained after sampling or after shaping filtering are buffered during the execution of the first phase. Then, during a second phase, a final candidate sample for the start of the frame is determined from the memorised samples, using the approximate frequency error and the candidate first sample estimated during the first phase.

20 Claims, 7 Drawing Sheets

(56) References Cited

U.S. PATENT DOCUMENTS

| | | | |
|---|---|---|---|
| 2010/0322366 A1* | 12/2010 | Kim | H04L 27/2656 |
| | | | 375/362 |
| 2011/0150123 A1* | 6/2011 | Han | H04B 7/18576 |
| | | | 375/295 |
| 2012/0195401 A1 | 8/2012 | Becker | |
| 2016/0269049 A1* | 9/2016 | Kim | H04L 1/0042 |
| 2016/0308559 A1* | 10/2016 | Li | H03F 1/3241 |
| 2016/0377427 A1* | 12/2016 | Collin | G06F 7/4818 |
| | | | 702/151 |
| 2017/0353228 A1* | 12/2017 | Watson | H04B 7/0825 |

OTHER PUBLICATIONS

Written Opinion of the ISA for PCT/FR2021/050659, dated Jul. 14, 2021, 7 pages.

* cited by examiner

METHOD AND RECEIVER DEVICE FOR DETECTING THE START OF A FRAME OF A SATELLITE COMMUNICATIONS SIGNAL

RELATED APPLICATION

This application is the U.S. national phase of International Application PCT/FR2021/050659 filed Apr. 15, 2021 which designated the U.S. and claims priority to FR 2003838 filed Apr. 16, 2020, the entire contents of each of which are hereby incorporated by reference.

FIELD OF THE INVENTION

The present invention belongs to the field of satellite communications. More particularly, the invention relates to a method and a receiver device for detecting the start of a frame of a satellite communication signal.

PRIOR ART

Satellite communications are based on radio signals exchanged between a satellite and a ground station, or between two satellites. A satellite communication signal generally includes data frames which could be transmitted continuously ("continuous transmission") or in packets ("burst transmission").

Satellite communications should have a particularly low error rate on the received frames (FER for "Frame Error Rate"). Indeed, it is generally not appropriate, for satellite communications, to use mechanisms for the retransmission of non-received or erroneous frames. This is explained in particular by the considerable delay in transmission due to the distance separating the emitter (for example a satellite) and the receiver (for example a ground station).

There are currently several satellite communications standards, in particular the DVB-S2 standard (acronym for "Digital Video Broadcasting-Satellite 2") which enables the broadcast of digital television by satellite to the general public. In the DVB-S2 protocol, the data frames are transmitted continuously, and conventional synchronisation methods, such as Gardner's algorithm, are used to maintain symbol synchronisation after sampling of the signal (cf. for example Appendix C of the ETSI TR 102 376-1 v1.2.1 specification which recommends the use of Gardner's algorithm).

However, the reception methods conventionally implemented to receive a DVB-S2 signal are not well suited to receive a satellite communication signal transmitted in packets. When the frames are transmitted in packets, two successive frames may be separated by a period of time in which only noise is observable on the signal. It then becomes necessary to accurately detect the start of a frame.

The conventional methods that could be considered to adapt a method for receiving a DVB-S2 signal to the reception of a signal transmitted by packets lead to particularly complex and expensive architectures for the receiver device.

There is currently no satisfactory method enabling the synchronisation of a frame of a satellite communication signal having a low complexity and supporting a packet transmission operation.

The DVB-RCS standard (acronym for "Digital Video Broadcasting-Return Channel via Satellite") defines a return channel for DVB-S2 communications which are primarily unidirectional. The DVB-RCS standard uses a frame-by-packet transmission. Nonetheless, the receiver devices implementing the DVB-RCS standard are particularly complex and expensive. This is all the more true in a high mobility context. This is the case in particular for a communication channel with a satellite in low orbit (LEO for "Low Earth Orbit").

The US patent application 2009/037792 A1 describes a system for receiving a broadcast signal. The reception system includes a detector configured to detect a known sequence in the data carried by the broadcast signal, and a channel equaliser configured to perform channel equalisation on the received data using the detected known sequence. However, this system does not always offer a satisfactory tradeoff in terms of simplicity (low cost) and reliability, in particular for satellite communications.

To present enough reliability, the reception systems of the prior art generally include several complex correlators. The patent application US 2012/0195401 A1 aims to limit the number of these correlators to reduce the complexity and therefore the cost of the reception system. However, such a system does not always offer enough reliability, in particular for satellite communications

DISCLOSURE OF THE INVENTION

The present invention aims to overcome all or part of the drawbacks of the prior art, in particular those set out hereinbefore, by proposing a method and a receiver device for detecting the start of a frame of a satellite communication signal for which the complexity is significantly reduced.

To this end, and according to a first aspect, the present invention proposes a method for detecting the start of a frame of a communication signal. The frame includes a preamble corresponding to a predetermined sequence of binary symbols. The method includes:

a sampling of the signal, a filtering for shaping the samples obtained directly at the output of the sampling, a first phase for estimating an approximate frequency error of the signal and a candidate first sample for the start of the frame, said first phase including:

for each of a plurality of predetermined frequency hypotheses: a correlation between the samples obtained after shaping filtering and at least one portion of the preamble, an estimation on the one hand of a candidate first sample for the frame start corresponding to a sample for which the best correlation value obtained among the different frequency hypotheses is higher than a predetermined threshold and, on the other hand, of the approximate frequency error from the frequency hypothesis having provided the best correlation value, a buffering of the samples obtained at the output of the sampling or at the output of the shaping filtering in a buffer memory while the first phase is executed, a second phase for accurately estimating a final candidate sample for the start of the frame, said second phase including:

a frequency correction applied to the samples obtained at the output of the buffer memory, said frequency correction being determined from the approximate frequency error estimated at the first phase, a correlation between the corrected samples and the preamble for a limited set of samples comprising the candidate first sample, a determination of the final candidate sample for the start of the frame corresponding to the sample for which the best correlation value is obtained.

The method according to the invention differs from conventional methods for receiving a communication signal according to the DVB-S2 standard in particular by the fact that a shaping filtering is "directly" applied on the samples obtained at the output of the sampler, i.e. in particular before a frequency correction is applied to said samples.

The preamble of the frame is known to both the emitter device and the receiver device. Each bit of the preamble is encoded by a binary symbol using, for example, a modulation of the BPSK (acronym for "Binary Phase Shift Keying") type.

The upstream application of a shaping filter on the one hand, and the use of a preamble modulated by a binary modulation on the other hand, allow significantly simplifying the correlation calculations performed during the first phase between the received signal and the expected preamble. Indeed, the used correlators no longer need to implement multipliers (adders are enough). Such arrangements allow significantly reducing the hardware complexity of the receiver device implementing the method according to the invention. Indeed, the correlators alone represent the major part (up to 80%, and possibly up to 90%) of the hardware complexity of the signal reception chain of the receiver device (without taking into account the decoder whose complexity strongly depends on the used technology).

The first phase allows estimating an approximate frequency error of the signal and a candidate first sample for the start of the frame by making several predetermined assumptions on a frequency error undergone by the signal. From these elements, the second phase then allows accurately determining a final candidate sample corresponding to a start time point of the frame.

The correlations performed during the first phase, for the different predetermined frequency hypotheses, are executed continuously ("stream processing"), until the detection of a valid candidate. On the other hand, the correlation performed during the second phase is done for a single frequency, in a window of samples around the candidate sample estimated by the first phase. Hence, the correlation calculations performed during the second phase are limited to a small set of samples comprising the candidate first sample, and for a single frequency.

In particular modes of implementation, the invention may further include one or more of the following features, considered separately or in any technically-feasible combination.

In particular modes of implementation, the first phase further includes a decimation of the samples obtained at the output of the shaping filtering, before the correlations for the different frequency hypotheses.

This sample decimation step during the first phase, before the correlation calculations performed for the different frequency hypotheses, also contributes to a considerable reduction in the hardware complexity of the correlators. In particular, this decimation step is made possible thanks to the upstream application of the shaping filter which also serves as an anti-aliasing filter.

In particular modes of implementation, the buffering of the samples is performed at the output of the shaping filtering.

In particular modes of implementation, the buffering of the samples is performed at the output of the sampling and the second phase further includes a filtering for shaping the samples obtained at the output of the frequency correction.

In particular modes of implementation, the correlations performed during the first phase are carried out on only one portion of the preamble.

Herein again, such arrangements allow reducing the hardware complexity of the receiver device. Using a truncated preamble for the correlation calculations performed during the first phase allows limiting the number of frequency hypotheses to be made, and therefore the number of correlators to be used. Indeed, the larger the size of the preamble, the more a considerable frequency error will lead to inconsistencies in the correlation calculations. In other words, it could become counterproductive to use a preamble with an excessively large size for the correlation calculations of the first phase where there is no information yet on the frequency error undergone by the signal. Using the entirety of the preamble could, for example, require increasing the number of frequency hypotheses to reduce the frequency difference between two hypotheses and thus ensure having at least one frequency hypothesis which corresponds enough to the frequency error undergone by the signal.

In particular modes of implementation, the first phase further includes a reduction in the size of the set of values used to quantise the samples obtained after shaping filtering, before performing the correlations. Where appropriate, this step of reducing the size of the set of values used to quantise the samples could be performed after the step of decimating the samples obtained at the output of shaping filtering.

Reducing the quantisation of the samples used for the correlation calculations of the first phase is another means for reducing the hardware complexity of the receiver device. Indeed, a reduced quantisation (corresponding for example to encoding the value of each sample over only four bits instead of eight or sixteen bits) could be enough to estimate in a satisfactory manner an approximate frequency error undergone by the signal and the candidate first sample for the start of the frame.

In particular modes of implementation, the number and the values of the frequency hypotheses are predetermined as a function of an estimated signal-to-noise ratio, a desired maximum frame error rate, and a considered maximum frequency error.

In particular modes of implementation, the correlation performed during the second phase includes a first correlation on a first portion of the preamble and a second correlation on a second portion of the preamble. A final correlation value is calculated as a function of the correlation values obtained respectively for the first correlation and for the second correlation.

Indeed, the preamble could be split into at least two distinct portions, each portion leading to separate correlation calculations, in order to offer a better robustness against a residual frequency error. As explained before, a residual frequency error could lead to inconsistencies in the results obtained for correlation calculations using a large-size preamble. It is then preferable to combine different results of partial correlations obtained respectively for different portions of the preamble to define a reliable final correlation value.

In particular modes of implementation, the second phase further includes an estimation of a fractional delay to be added or subtracted from the time point of the final candidate sample to determine the start of the frame. The fractional delay corresponding to a fraction of the sampling period. Such arrangements allow optimising the accuracy of the determination of the start time point of the frame.

In particular modes of implementation, the frame includes a sequence of bits corresponding to the preamble and a sequence of bits corresponding to payload data. The sequence of bits of the preamble is modulated by a BPSK modulation, and the sequence of payload data bits is modulated by a higher-order modulation for which a modulation symbol encodes at least two bits. For example, the sequence of payload data bits could be modulated by a QPSK ("Quadrature Phase Shift Keying") modulation for which a symbol encodes two bits of data, an 8PSK modulation ("Eight Phase Shift Keying") for which a symbol encodes three bits of data, or a 16APSK modulation ("Sixteen Amplitude and Phase Shift Keying") for which a symbol encodes four bits of data. It should be noted that the frame may also include so-called "pilot" bits distributed throughout the frame to facilitate synchronisation. It should also be noted that other modulations could be considered. The invention is in no way limited to a particular content of the frame or to a particular modulation.

According to a second aspect, the present invention relates to a computer program product including a set of program code instructions which, when executed by a processor, configure said processor to implement a method for detecting the start of a frame of a communication signal according to any one of the preceding modes of implementation.

According to a third aspect, the present invention relates to a receiver device for detecting the start of a frame of a communication signal. The frame includes a preamble corresponding to a predetermined sequence of binary symbols. The receiver device includes a processing circuit including:
- a sampling module to sample the signal,
- a shaping filter to filter the samples obtained directly at the output of the sampling module,
- several correlators respectively associated with different frequency hypotheses, to perform, for the samples obtained at the output of the shaping filter, and for each frequency hypothesis, a calculation of correlation with at least one portion of the preamble,
- an estimation module configured to:
    estimate a candidate first sample for the frame start corresponding to a sample for which the best correlation value obtained among the different frequency hypotheses is higher than a predetermined threshold,
    estimate an approximate frequency error from the frequency hypothesis having provided the best correlation value,
- a buffer memory to temporally record the samples obtained at the output of the sampling module or at the output of the shaping filter,
- a frequency correction module configured to apply to the samples obtained at the output of the buffer memory a frequency correction determined from the estimated approximate frequency error,
- a correlator configured to perform, for each sample of a limited set of corrected samples comprising the candidate first sample, a calculation of correlation with the preamble,
- a detection module configured to determine a final candidate sample for the start of the frame corresponding to the sample for which the best correlation value is obtained.

In particular embodiments, the invention may further include one or more of the following features, considered separately or in any technically-feasible combination.

In particular embodiments, the receiver device further includes a decimation module for decimating the samples obtained at the output of the shaping filter, before processing by the correlators associated with the different frequency hypotheses.

In particular embodiments, the buffer memory temporally records the samples obtained at the output of the shaping filter.

In particular embodiments, the buffer memory temporally records the samples obtained at the output of the sampling module and the receiver device further includes a filter for shaping the samples obtained at the output of the frequency correction module.

In particular embodiments, the correlators associated respectively with the different frequency hypotheses are configured to perform correlation calculations on only one portion of the preamble.

In particular embodiments, the receiver device further includes a conversion module to reduce the quantisation size of the samples obtained after the shaping filter. Where appropriate, the conversion module could be placed after the decimation module. The conversion module is placed before processing by the correlators associated with the different frequency hypotheses.

In particular embodiments, the correlator is configured to perform a first correlation calculation on a first portion of the preamble and a second correlation calculation on a second portion of the preamble. A final correlation value is calculated as a function of the correlation values obtained respectively for the first portion and for the second portion of the preamble.

According to a fourth aspect, the present invention relates to a satellite or an aircraft including a receiver device according to any one of the preceding embodiments. Indeed, the invention is applicable not only to satellite communications, but also to other types of communications such as communications between a ground station and an aircraft, between two aircrafts, between an aircraft and a satellite, etc. By aircraft, it should be understood any device capable of moving in the air (airplane, drone, helicopter, etc.).

According to a fifth aspect, the present invention relates to a ground station including a receiver device according to any one of the preceding embodiments.

PRESENTATION OF THE FIGURES

The invention will be better understood upon reading the following description, provided as a non-limiting example, and made with reference to FIGS. 1 to 6 which represent.

In these figures, identical references from one figure to another refer to identical or similar elements. For clarity, the represented elements are not necessarily to the same scale, unless stated otherwise.

DETAILED DESCRIPTION OF AN EMBODIMENT OF THE INVENTION

As indicated before, the present invention relates to the synchronisation, by a receiver device, of a frame of a satellite communication signal.

Figure 1:
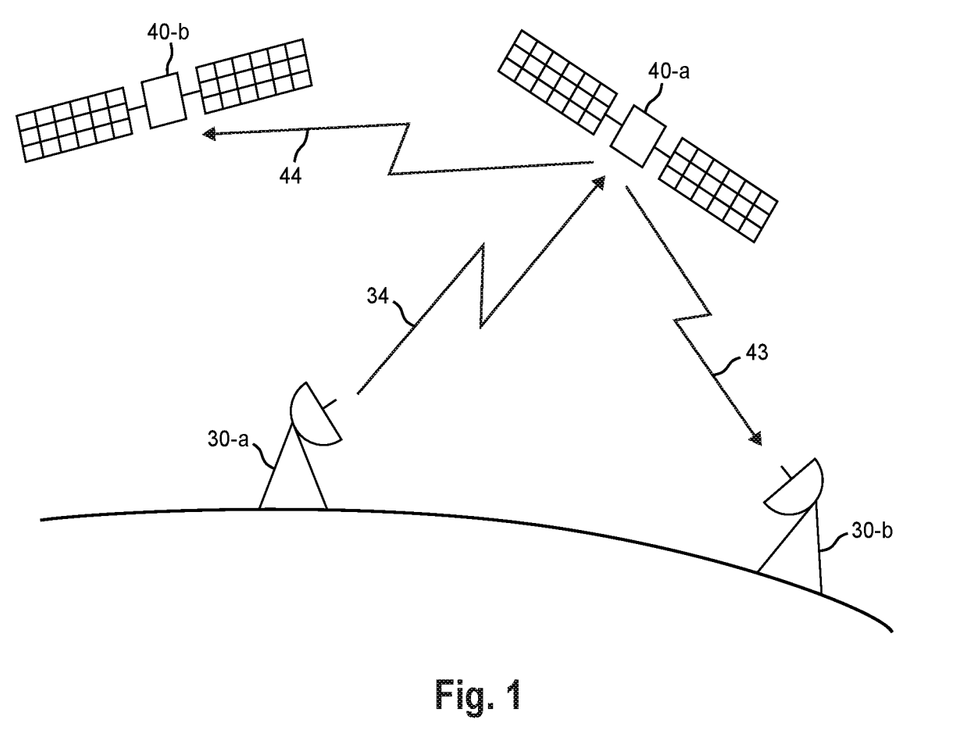
FIG. 1 a schematic representation of satellite communications.

As illustrated by FIG. 1, a satellite communication signal could for example be emitted by a ground station 30-*a* on an uplink 34 to a satellite 40-*a* in orbit around the Earth. In such a case, the satellite 40-*a* may include a receiver device according to the invention to detect the start of a frame contained in the signal.

According to another example, the satellite communication signal is emitted by the satellite 40-*a* on a downlink 43 to a ground station 30-*b*. In such a case, the ground station 30-*b* may include a receiver device according to the invention to detect the start of a frame contained in the signal.

According to yet another example, the satellite communication signal could be emitted by the satellite 40-*a* to another satellite 40-*b* on an inter-satellite uplink 44. In such a case, the satellite 40-*b* may include a receiver device according to the invention to detect the start of a frame contained in the signal.

The invention is particularly well suited for satellite communication signals emitted according to a packet transmission mode ("burst-mode transmission"). Nonetheless, it should be noted that nothing prevents the application of the invention to communication signals emitted according to a continuous transmission mode ("continuous-mode transmission"). The invention is suitable for both Frequency-Division Duplexing (FDD) methods and Time-Division Duplexing (TDD) methods. Also, the invention could be used for satellite communications of the transparent type or of the non-transparent type. In the example illustrated in FIG. 1, a communication between the ground station 30-*a* and the ground station 30-*b* via the satellite 40-*a* is of the "transparent" type if the satellite 40-*a* serves only as a repeater to the ground station 30-*b* of the signal received from the ground station 30-*a*. A communication between the ground station 30-*a* and the ground station 30-*b* via the satellite 40-*a* is of the "non-transparent" type if the satellite 40-*a* demodulates and decodes the signal received from the ground station 30-*a* before re-emitting this signal to the ground station 30-*b*.

Figure 2:
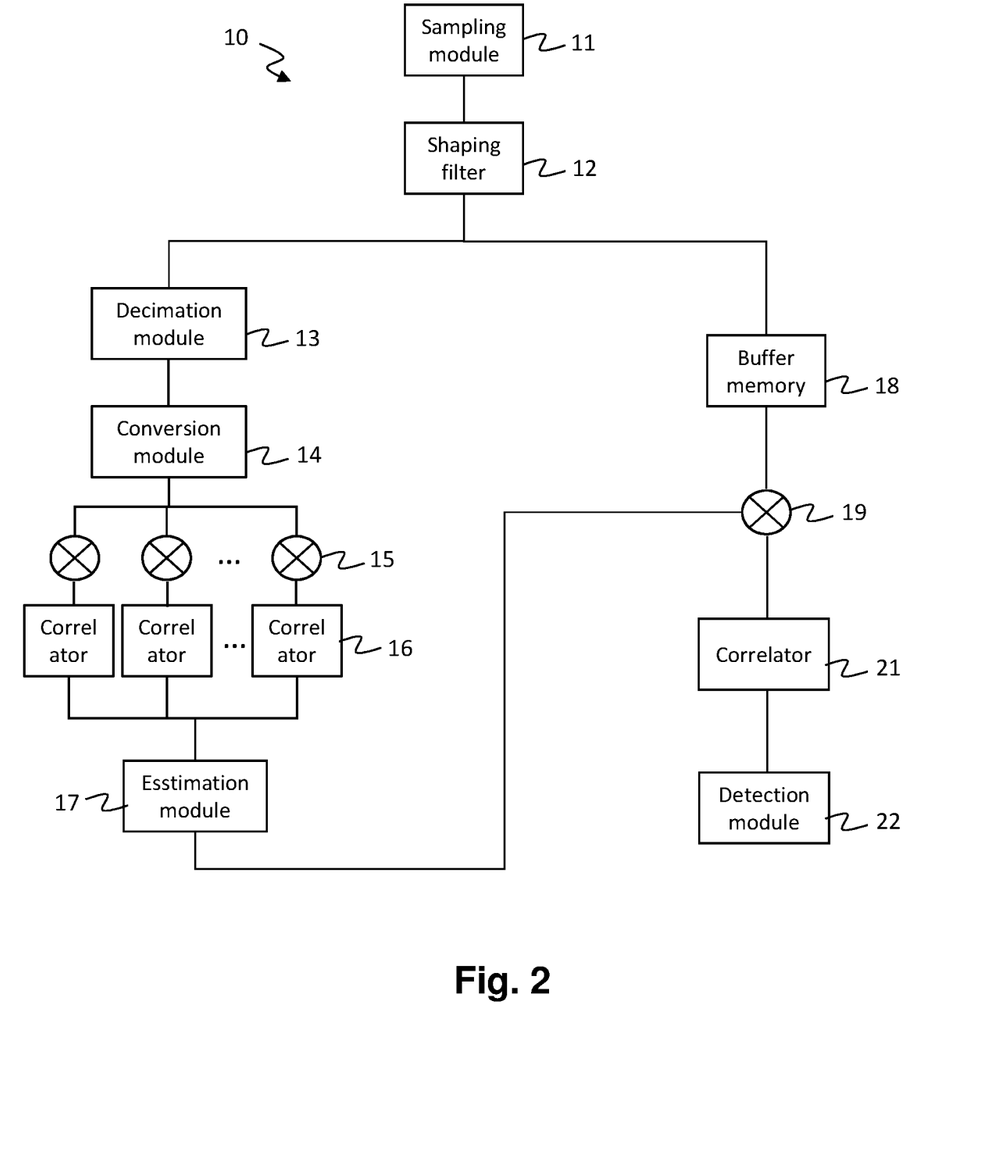
FIG. 2 a schematic representation of a particular embodiment of a receiver device according to the invention for detecting the start of a frame of a satellite communication signal, FIG. 3 a schematic representation of different frequencies corresponding to predetermined frequency hypotheses, FIG. 4 a detailed representation of several correlations performed respectively for different frequency hypotheses, as well as the estimation of a candidate first sample for the start of the frame on the one hand and an approximate frequency error on the other hand, FIG. 5 a schematic representation of a correlation including a first correlation calculation on a first portion of a preamble and a second correlation calculation on a second portion of said preamble, FIG. 6 a schematic representation of the main steps of a particular mode of implementation of a method according to the invention for detecting the start of a frame of a satellite communication signal, FIG. 7 a schematic representation of another particular embodiment of a receiver device according to the invention, FIG. 8 a schematic representation of the main steps of a particular mode of implementation of the method according to the invention corresponding to the particular embodiment described in FIG. 7.

FIG. 2 schematically represents an example of a receiver device 10 according to the invention.

The receiver device 10 is configured to detect the start of a frame of a satellite communication signal. For this purpose, the receiver device 10 includes for example a processing circuit including a digital reception chain with an architecture of the software radio type ("Software Defined Radio"). For example, the processing circuit includes one or more processor(s) and a memory in which a computer program is recorded which includes a set of program code instructions which, when they are executed by the processor(s), configure the processor(s) to implement a method according to the invention to detect the start of a frame contained in the received signal.

Alternatively or complementarily, the receiver device 10 includes one or more programmable logic circuit(s) (FPGA, PLD, etc.), and/or one or more special-purpose integrated circuit(s) (ASIC), and/or a set of discrete electronic components, etc., adapted to implement all or part of the steps of the method for synchronising a frame according to the invention. In other words, the receiver device 10 includes means which are configured in a software (specific computer program product) and/or hardware (FPGA, PLD, ASIC, discrete electronic components, etc.) way to implement the steps of the method according to the invention.

A frame includes a preamble, payload data and possibly pilot bits. The preamble corresponds to a predetermined sequence of binary symbols known to both the device that has emitted the frame and the receiver device. For example, the sequence of bits of the preamble is modulated by the emitter device by a BPSK modulation, for which each bit of the preamble is encoded by a binary symbol. To increase the transmission rate of the payload data, the sequence of bits corresponding to the payload data could in turn be modulated by a higher-order modulation for which a modulation symbol encodes several bits. For example, a QPSK modulation allows encoding two bits of data with a single symbol, an 8PSK modulation allows encoding three bits of data with a single symbol, and a 16APSK modulation allows encoding four bits of data with a single symbol. Nonetheless, other modulations could be considered.

As a non-limiting example, the rest of the description assumes the case where the preamble is a Gold sequence encoded over 256 BPSK symbols, and the payload data of the frame is encoded over 15,360 QPSK symbols.

As illustrated in FIG. 2, the receiver device 10 includes in particular a sampling module 11 for sampling the received signal reduced to baseband. The signal is sampled with a sampling frequency at least equal to the frequency of the symbols (in the case of a complex modulation) or at least equal to twice the frequency of the symbols (in the case of a real modulation). The sampling module 11 implements a conventional sampling method, considered to be known to a person skilled in the art.

As illustrated in FIG. 2, the samples obtained at the output of the sampling module 11 are filtered by a shaping filter 12. For example, this shaping filter 12 is implemented in the form of a Square-Root Raised Cosine filter (SRRC for the acronym "Square-Root Raised Cosine"). This could be the same filter as the shaping filter used by the emitter device when emitting the signal.

The sampling may be combined with an interpolation of the samples by the shaping filter 12 to obtain an oversampling factor (OSF standing for "Over Sampling Factor") at least equal to two (at least two samples per symbol). As a non-limiting example, the case of an oversampling factor equal to four (OSF=4) at the output of the shaping filter 12 is considered. Nonetheless, a higher oversampling factor (for example OSF=8, or OSF=16) could also be considered. In the considered example, each sample is encoded over eight bits. This means that the set of values that a sample could take includes $2^8=256$ elements. In other words, a quantisation over eight bits is used during the analog-to-digital conversion of the samples of the signal. Herein again, nothing prevents using a larger quantisation (for example a quantisation over sixteen bits). Different methods could be considered to obtain an oversampling factor equal to four. According to a first example, a sampling frequency equal to four times the symbol frequency is used; in such a case, it is not necessary to resort to an interpolation of the samples by the shaping filter 12. According to a second example, a sampling frequency equal to twice the frequency of the symbols is used, and a interpolation carried out by the shaping filter 12 doubles the number of obtained samples. According to a third example, a sampling frequency equal to the symbol frequency is used, and an interpolation carried out by the shaping filter 12 quadruples the number of obtained samples. For the example described with reference to FIGS. 2 to 5, the case where a complex modulation is used, the sampling frequency is equal to twice the symbol frequency is considered as a non-limiting example, and an interpolation is carried out by the shaping filter 12 to double the number of samples.

It should be noted that the shaping filtering is directly applied on the samples obtained at the output of the sampler 11, before a frequency correction is applied to said samples. In a conventional architecture of a reception chain for a satellite communication signal (and in particular as recommended in the DVB-S2 recommendations), a shaping filter is applied only after a first frequency correction on the received samples. In the invention, and as will be detailed later on, positioning the filter 12 upstream of a first frequency correction is however particularly advantageous for reducing the hardware complexity of the receiver device 10. This works well for frequency errors lower than or equal to 10% of the frequency of the baseband signal. In the case where more considerable frequency errors are to be considered, it is possible to add a frequency search with a "scan" function. According to another example, it is also possible to consider using several shaping filters in parallel with different frequencies.

Optionally, the receiver device 10 may also include a decimation module 13 to decimate the samples obtained at the output of the shaping filter 12. The decimation consists in keeping only part of the samples, for example one out of two samples. In particular, this decimation step is made possible thanks to the upstream application of the shaping filter 12 which also acts as an anti-aliasing filter. Optionally, this decimation step may be accompanied with a re-sampling based on an interpolation of the signal to guarantee that the signal remaining after decimation actually contains information and that it does not consist only of noise. In the considered example, the decimation module 13 suppresses one sample out of two, and an oversampling factor equal to two (OSF=2) is obtained at the output.

Optionally, the receiver device 10 may include a conversion module 14 configured to reduce the quantisation size of the samples obtained at the output of the decimation module 13. For example, the quantisation of the samples may be reduced to four bits. This means that at the output of the conversion module 14 the value of each sample is for example encoded over four bits, and no longer over eight bits. It should be noted that an Automatic Gain Control (AGC) method could be used when converting the amplitude of the samples.

The receiver device 10 includes a set of correlators 16 respectively associated with different frequency hypotheses. The correlators 16 are configured to perform, for each frequency hypothesis, for the samples obtained at the output of the shaping filter 12 (or, where appropriate, at the output of the decimation module 13 or at the output of the conversion module 14), a calculation of correlation with at least one portion of the preamble.

For example, the number and the values of the frequency hypotheses are predetermined as a function of an estimated signal-to-noise ratio, a desired maximum frame error rate, and a maximum frequency error considered for the considered signal. Quite intuitively, the lower the minimum possible value of the signal-to-noise ratio for the considered signal, the larger the number of frequency hypotheses. Similarly, the lower the maximum value of the desired frame error rate, the larger the number of frequency hypotheses should be. Also, the higher the maximum frequency error considered for the considered signal, the larger the number of frequency hypotheses should be.

Figure 3:
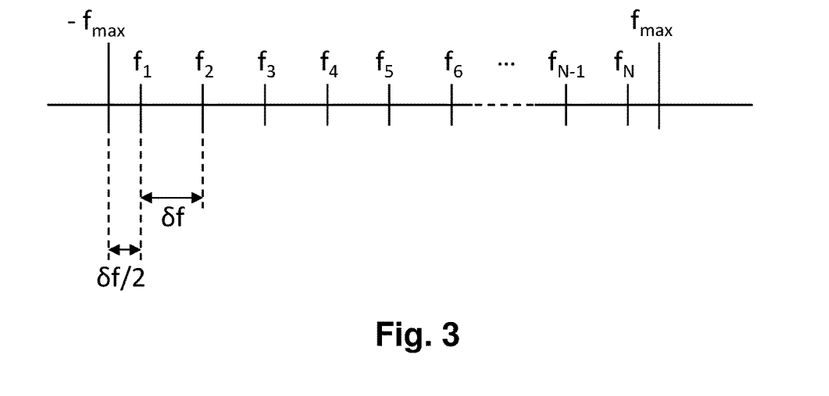

FIG. 3 schematically represents different frequencies ($f_1$, $f_2$, $f_3$, ..., $f_{N-1}$, $f_N$) corresponding to frequency hypotheses. The number of frequency hypotheses is denoted N. For example, each frequency hypothesis corresponds to a possible value of a frequency error observed by the receiver device 10 on the signal. For example, this frequency error is due to a Doppler effect generated by a movement between the emitter device and the receiver device relative to each other. A frequency shift and/or a frequency drift between a clock of the emitter device and a clock of the receiver device could also contribute to the frequency error observed by the receiver device on the signal. It is possible to estimate a maximum frequency error $f_{max}$ such that the frequency error observed by the receiver device on the signal generally remains comprised between $-f_{max}$ and $f_{max}$ ($f_{max}$ is for example determined as a function of a maximum speed of movement of the emitter device relative to the receiver device, and/or as a function of a maximum frequency shift and/or drift between the clocks of the receiver device and of the emitter device). As illustrated in FIG. 3, N frequency hypothesis values $f_1$ to $f_N$ could be defined in the frequency interval $[-f_{max}; f_{max}]$. In the considered example, the number N is odd and two consecutive frequency hypotheses are separated by a difference $\delta f$ equal to $(2 \times f_{max})/N$. There are then as many positive frequency hypotheses as there are negative frequency hypotheses (the value 0 not being part of the set of frequency hypotheses). Nonetheless, it should be noted that the method described with reference to FIG. 3 for determining the frequency hypotheses is only an example and that other methods could be considered. The selection of a particular method for determining the frequency hypotheses is only one variant of the invention.

According to a first example, a 1 dB signal-to-noise ratio and a maximum frequency error $f_{max}$ equal to 5% of the theoretical frequency of the signal are considered. An error rate criterion (FER) for the synchronisation of a frame less than $10^{-6}$ is selected. Fifty correlators 16 (N=50) should then be used.

According to another example, and still for an error rate criterion (FER) for the synchronisation of a frame less than $10^{-6}$, a 1 dB signal-to-noise ratio and a maximum frequency error $f_{max}$ equal to 1.2% of the theoretical frequency of the signal are considered. Twelve correlators 16 (N=12) should then be used.

Figure 4:
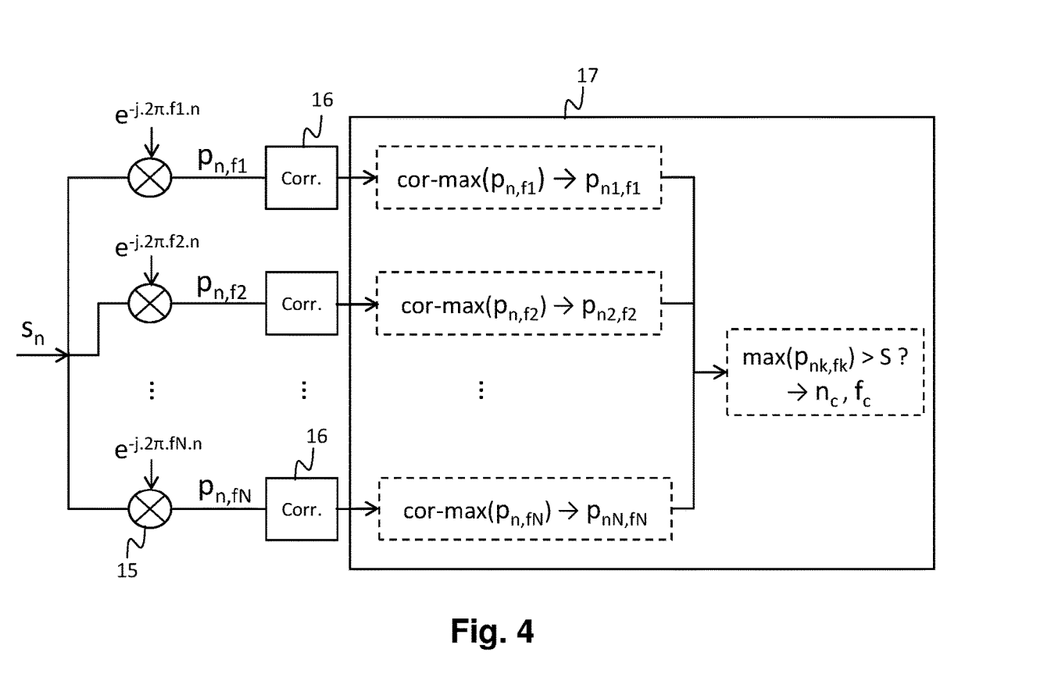

For each frequency hypothesis, correlation calculations are performed between a set of samples and an expected sequence of samples corresponding to the preamble (or to a portion of the preamble). For this purpose, and as illustrated in FIG. 4, the samples $s_n$ obtained at the output of the decimation module 13 (or, where appropriate, at the output of the conversion module 14) are copied N times, and for each copy a correction module 15 is configured to apply a frequency correction corresponding to one of the frequency hypotheses $f_1$ to $f_N$. The N different versions of the corrected samples are denoted $p_{n,f1}$, $p_{n,f2}$, ..., $P_{n,fN}$. Correlation calculations are then executed by the correlators 16, for each frequency hypothesis, between the corresponding version of the corrected samples and the preamble. Each correlation calculation provides as a result a correlation value for a given sample and for a given frequency hypothesis.

An estimation module 17 is then configured to determine the best correlation value from among the set of correlation values obtained for a given sample and for the different frequency hypotheses. A sample for which the best correlation value obtained from among the different frequency hypotheses is higher than a predetermined threshold S then corresponds to a candidate first sample for the start of the frame. As indicated before, the correlation calculations performed for the different frequency hypotheses are done continuously until a candidate first sample is detected.

The value of the threshold S could be predetermined as a function of a desired maximum value for the frame error rate (FER) for a given signal-to-noise ratio (SNR). Calculations of the probability of non-detection of a frame and of the probability of false detection of a frame could also be performed, in a conventional manner, to define a value of the threshold S.

In the example illustrated in FIG. 4, the index of the sample $p_{n1,f1}$ for which the best correlation value for the frequency hypothesis $f_1$ is obtained is denoted $n_1$, the index of the sample $p_{n2,f2}$ for which the best correlation value for the frequency hypothesis $f_2$ is obtained is denoted $n_2$, ..., and the index of the sample $p_{nN,fN}$ for which the best correlation value for the frequency hypothesis $f_N$ is obtained is denoted $n_N$. We denote $n_c$ the index and $f_c$ the frequency hypothesis associated with the sample $p_{nc,fc}$ for which the highest correlation value is obtained among the correlation values associated respectively with the samples $p_{nk,fk}$, with k varying between 1 and N. If this highest correlation value is higher than the threshold S, then $p_{nc,fc}$ is a candidate first sample for the start of the frame, and $f_c$ corresponds to an approximate frequency error of the signal. The actual frequency error of the signal could generally be expected to be comprised between $(f_c-\delta f/2)$ and $(f_c+\delta f/2)$. The larger the number N of frequency hypotheses, the higher the accuracy of the estimate of the approximate frequency error, but the larger the number of correlators 16 and therefore the complexity of the receiver device 10.

It is important to note that the correlators 16 alone represent a very large part (between 80% and 90%) of the hardware complexity of the reception chain of the receiver device 10 (excluding the decoder). The upstream application of the shaping filter 12 on the one hand, and the use of a preamble modulated by a binary modulation on the other hand, allow significantly simplifying the correlation calculations and therefore the hardware complexity of the correlators 16. Indeed, the correlators 16 no longer need to implement multipliers (adders are enough). The fact of having decimated the samples of the received signal before the correlation calculations performed for the different frequency hypotheses also contributes to a considerable reduction in the hardware complexity of the correlators. Indeed, as the number of samples is reduced, the number of correlation calculations to be performed is also reduced. The reduction in the quantisation of the samples implemented by the conversion module 14 is another means for reducing the hardware complexity of the correlators 16.

As indicated before, it is preferable to perform the correlation calculations on only one portion of the preamble, rather than on the entirety of the preamble. Herein again, using a truncated preamble for the correlation calculations allows reducing the hardware complexity of the receiver device 10. Indeed, this allows limiting the number of frequency hypotheses to be made, and therefore the number of correlators to be used. Indeed, the larger the size of the preamble used for the correlation calculations, the more a considerable frequency error will lead to inconsistencies in the correlation results. In other words, it could become counterproductive to use a preamble with a very large size for the correlation calculations when there is no information yet on the frequency error of the signal.

It should be noted that the different correlators 16 do not necessarily correspond to distinct physical entities, but they may correspond for example to different correlation kernels implemented by the same processor.

As illustrated in FIG. 2, the receiver device 10 includes a buffer memory 18 for temporally recording the samples obtained at the output of the shaping filter 12. This buffer memory 18 allows compensating for the latency due to the different processing operations allowing estimating the approximate frequency error of the signal and the candidate first sample for the start of the frame.

A frequency correction module 19 is configured to apply to the samples at the output of the buffer memory 18 a frequency correction determined from the approximate frequency error estimated by the estimation module 17. In the considered example, this frequency correction is equal to the approximate frequency error $f_c$.

Another correlator 21 is then configured to perform, for each sample of a limited set of corrected samples comprising the candidate first sample, a calculation of correlation with the preamble (the entirety of the preamble is used for this correlation). The set of considered samples includes a limited number of samples in order to limit the number of correlation calculations performed by the correlator 21. For example, the size of the limited set of samples is equal to twice the oversampling factor plus one element (2×OSF+1). In the example considered, for which we have an oversampling factor OSF=4, the limited set of samples includes for example the candidate first sample of index $n_c$ as well as the four previous samples and the next four samples (i.e. the samples whose index varies between $(n_c-n_0)$ et $(n_c+n_0)$, with $n_0=4$).

A detection module 22 is configured to determine the index $n_{start}$ of a final candidate sample corresponding to the start of the frame. The final candidate sample corresponds to the sample for which the best correlation value is obtained among the correlation values calculated by the correlator 21.

Figure 5:
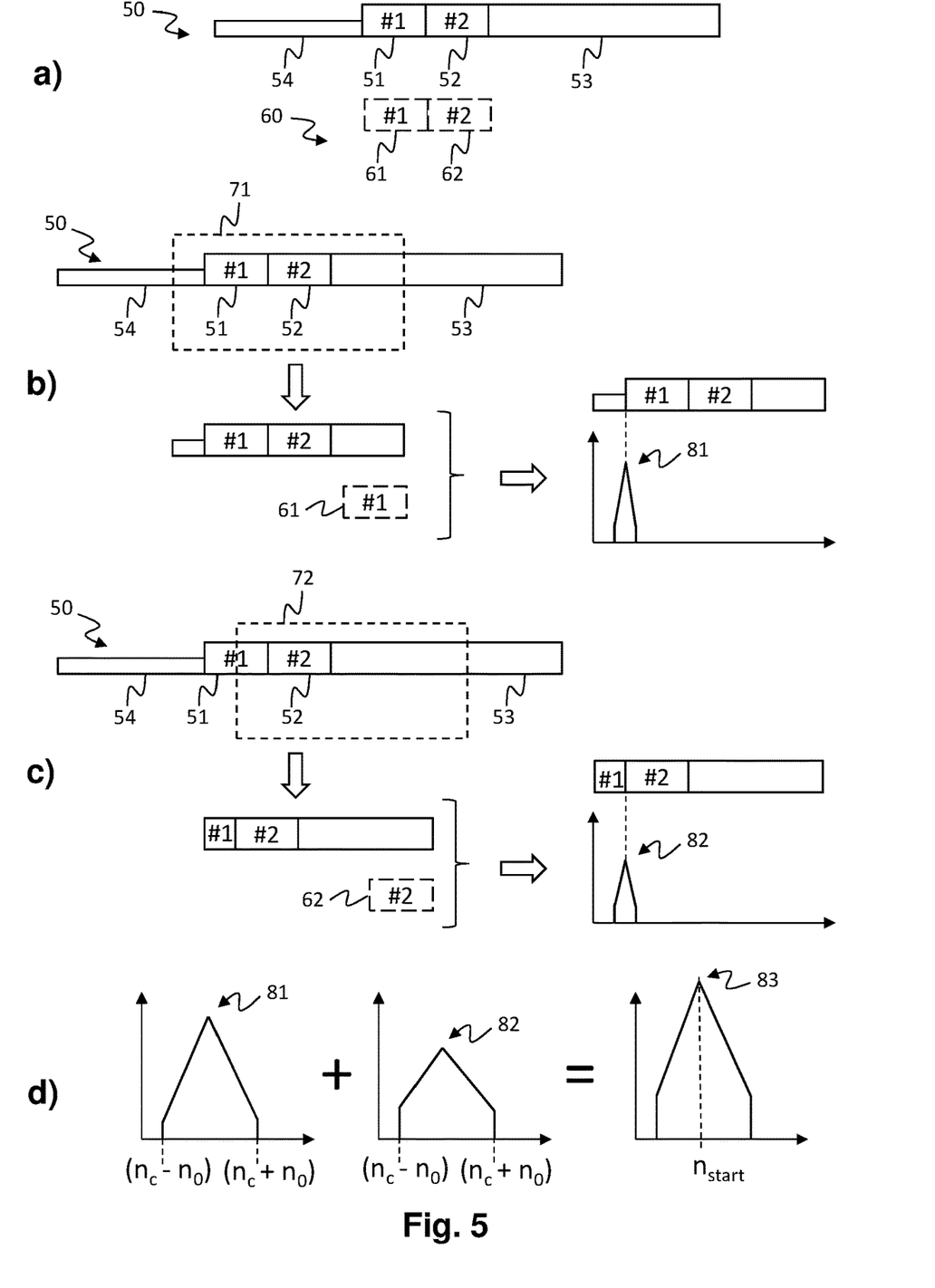

In particular embodiments, and as illustrated in FIG. 5, the correlation performed by the correlator 21 includes a first correlation on a first portion of the preamble and a second correlation on a second portion of the preamble. A final correlation value is then calculated as a function of the correlation values obtained respectively for the first correlation and for the second correlation.

Part a) of FIG. 5 schematically represents a signal 50 received by the receiver device 10. The received signal 50 includes noise 54 and a frame including a first portion 51 of the preamble, a second portion 52 of the preamble, and payload data 53. Part a) of FIG. 5 also represents the preamble 60 theoretically expected by the receiver device, with a first portion 61 of the preamble and a second portion 62 of the preamble. For example, each of the first portion 51, 61 and the second portion 52, 62 of the preamble corresponds to one half of the preamble. In the considered example, the first portion 61 then includes samples corresponding to the first 128 symbols of the preamble. The second portion 62 then includes samples corresponding to the last 128 symbols of the preamble.

Part b) of FIG. 5 schematically represents a first correlation performed between the first portion 61 of the preamble and a set of samples of the received signal 50 contained in a correlation window 71. The correlation calculations are performed only for the samples whose index varies between $(n_c-n_0)$ and $(n_c+n_0)$. A correlation peak 81 is then obtained for a given sample among these samples.

Part c) of FIG. 5 schematically represents a second correlation performed with the second portion 62 of the preamble for a set of samples of the received signal 50 contained in a correlation window 72 shifted by a number of samples equal to the length of the sequence of samples forming the first portion 61 of the preamble 60. Herein again, the correlation calculations are performed only for the samples whose index varies between $(n_c-n_0)$ and $(n_c+n_0)$. A correlation peak 82 is then obtained for a given sample among these samples.

Part d) of FIG. 5 schematically illustrates the fact that the results of the first correlation are added to the results of the second correlation. A correlation peak 83 could then be determined for the final results thus obtained. The correlation peak 83 is associated with an index denoted $n_{start}$ of the final candidate sample for the start of the frame.

Splitting the preamble into at least two distinct portions, each portion leading to separate correlation calculations, allows obtaining a better robustness against the residual frequency error. As explained before, a non-negligible frequency error could lead to inconsistencies in the results obtained for correlation calculations using a large-size preamble. It is then preferable to combine different results of partial correlations obtained respectively for different portions of the preamble to define a reliable final correlation value.

In particular modes of implementation, it is also possible to consider estimating a fractional delay to be added or subtracted at the time point of the final candidate sample to determine the start of the frame with more accuracy. The fractional delay corresponds to a fraction of the sampling period. This is particularly interesting if the used oversampling factor is not particularly high (as in the considered example where an oversampling factor OSF=4 is used). This is less interesting when a higher oversampling factor is used (for example OSF≥16). Also, when a fractional delay should be calculated, it is preferable to use a sufficient quantisation of the samples (for example over eight bits, and possibly over sixteen bits). There are different methods for calculating a fractional delay, such as a method based on the barycentre of the correlation peaks, or a method based on a Lagrange interpolation.

It should be noted that not all of the different elements represented in FIG. 2 are necessarily entities distinct of the receiver device 10. In particular, several ones of these elements could be implemented digitally within an FPGA, PLD or ASIC in the form of CORDIC-type (acronym for "COrdinate Rotation Digital Computer", "digital calculation by rotation of coordinates") algorithms or within the same ROM type microcontroller. In particular, the invention is well suited to the use of Time Division Multiplexing (TDM) techniques for the frequency correction calculations and for the correlation calculations.

Figure 6:
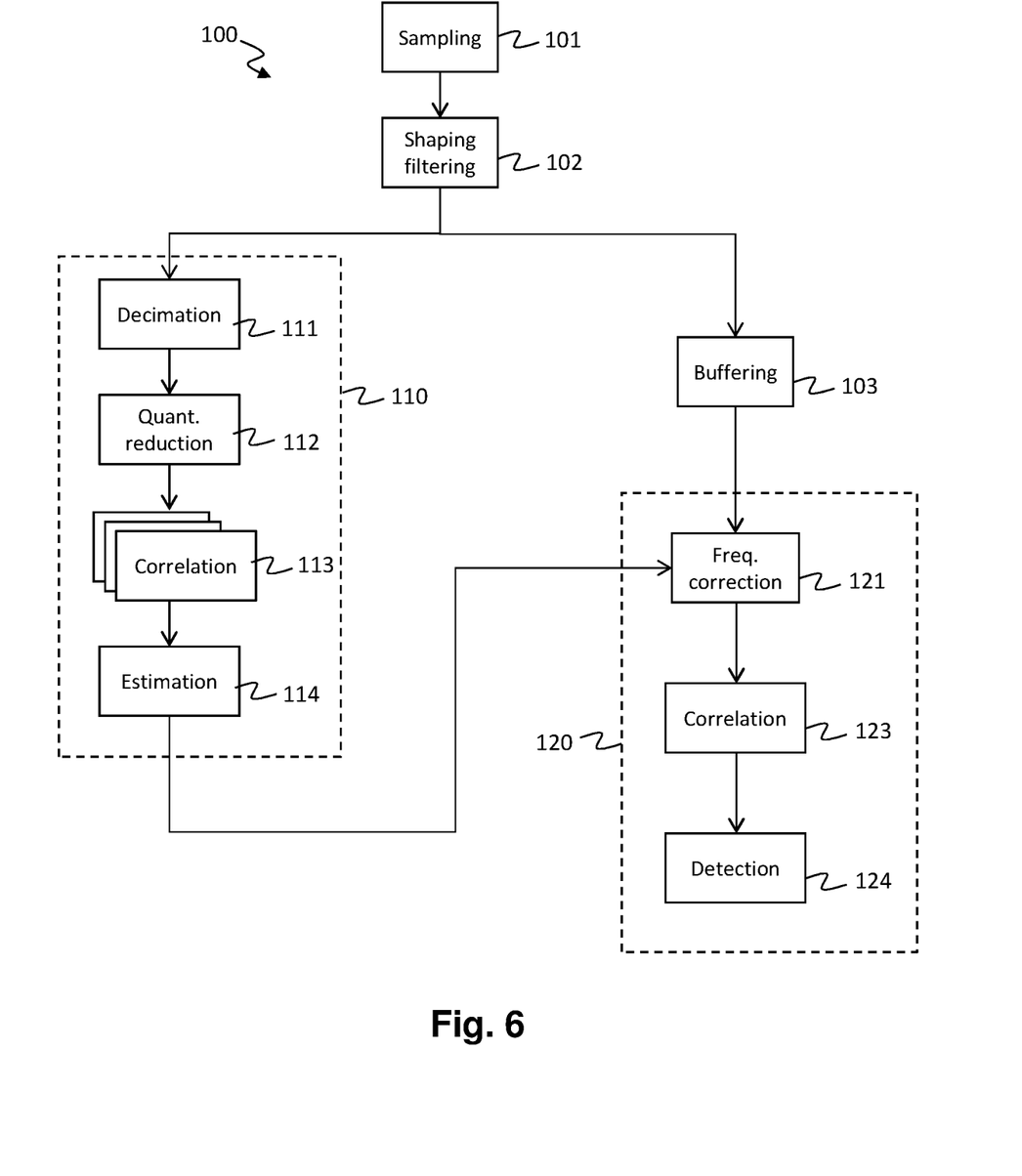

FIG. 6 schematically represents the main steps of a particular mode of implementation of a method 100 according to the invention for detecting the start of a frame of a satellite communication signal. This method 100 is implemented by the receiver device 10 previously described with reference to FIGS. 2 to 5.

As illustrated in FIG. 6, the method 100 first includes a step 101 of sampling the signal.

Afterwards, the method 100 includes a filtering step 102 for shaping the samples obtained directly at the output of the sampling step 101.

Afterwards, the method 100 is split between a first phase 110 to estimate an approximate frequency error of the signal and a candidate first sample for the start of the frame, and a second phase 120 to accurately estimate a final candidate sample for the start of the frame.

Optionally, the first phase 110 includes a step 111 of decimating the samples obtained at the output of the shaping filtering step 102.

Optionally, the first phase 110 also includes a step 112 of reducing the size of the set of values used to quantise the samples obtained after the decimation step 111.

Afterwards, for each of a plurality of predetermined frequency hypotheses, a correlation 113 is performed between the samples obtained after the shaping filtering step 102 (or, where appropriate, after the decimation step 111 or after the quantisation reduction step 112) and at least one portion of the preamble.

An estimation step 114 allows estimating on the one hand a candidate first sample for the frame start and on the other hand an approximate frequency error of the signal. The candidate first sample for the frame start corresponds to a sample for which the best correlation value obtained among the different frequency hypotheses is higher than a predetermined threshold. The approximate frequency error corresponds to the frequency hypothesis having provided the best correlation value. A frame is detected only if the correlation calculations allow identifying at least one sample for which the calculated correlation value is higher than the threshold.

The method 100 also includes a step 103 of buffering (i.e. temporally recording) the samples obtained at the output of the sampling step 101 or at the output of the shaping filtering step 102 in a buffer memory while the first phase 110 is executed.

The second phase 120 begins when an approximate frequency error of the signal and a candidate first sample for the start of the frame have been detected during the first phase 110.

The second phase 120 includes a frequency correction step 121 applied to the samples obtained at the output of the shaping filter. The frequency correction 121 is determined from the approximate frequency error estimated during the first phase 110.

The second phase 120 also includes a correlation 123 between the corrected samples obtained at the output of the frequency correction step 121 and the preamble. However, this correlation 123 is performed only for a limited set of samples comprising the candidate first sample, in order to limit the number of correlation calculations.

Finally, a step 124 allows determining a final candidate sample for the start of the frame. The final candidate sample for the start of the frame corresponds to the sample for which the best correlation value is obtained. The time point of the final candidate sample provides an accurate estimate of the start time point of the frame.

The subsequent stages of the frame reception chain are not described as they are beyond the scope of the invention.

In particular, these subsequent steps could include, in a conventional manner, an accurate frequency synchronisation and a decoding of the frame.

Figure 7:
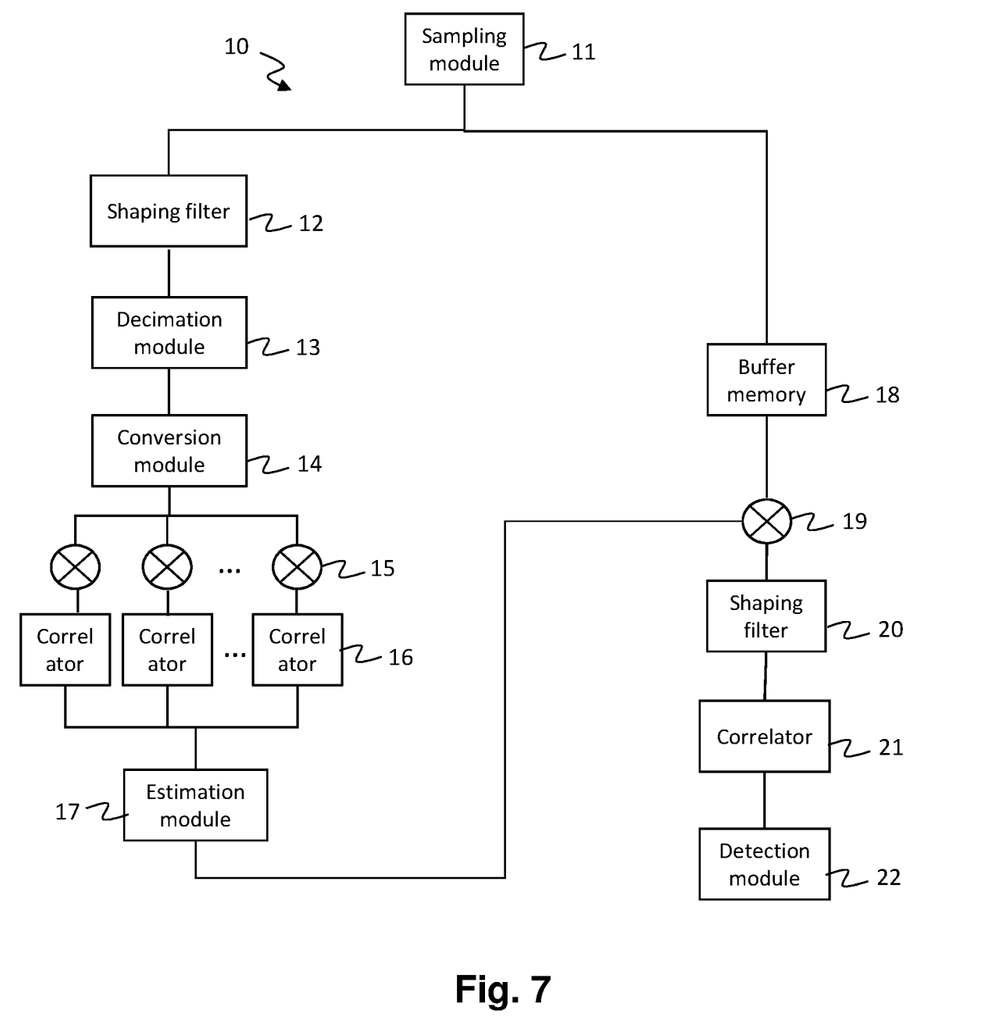

FIG. 7 describes another particular embodiment of a receiver device 10 according to the invention. The difference with respect to the particular embodiment described with reference to FIG. 2 lies in that the buffer memory 18 memorises the samples obtained at the output of the sampling module 11 (and not at the output of the shaping filter 12). Another shaping filter 20 is then used to filter the samples obtained at the output of the frequency correction module 19, before passage into the correlator 21. Such arrangements could allow improving the synchronisation performances of a frame, nonetheless they require a greater depth of the buffer memory 18. Otherwise, the particular embodiment of the receiver device 10 described with reference to FIG. 7 is similar to that described with reference to FIGS. 2 to 5.

Figure 8:
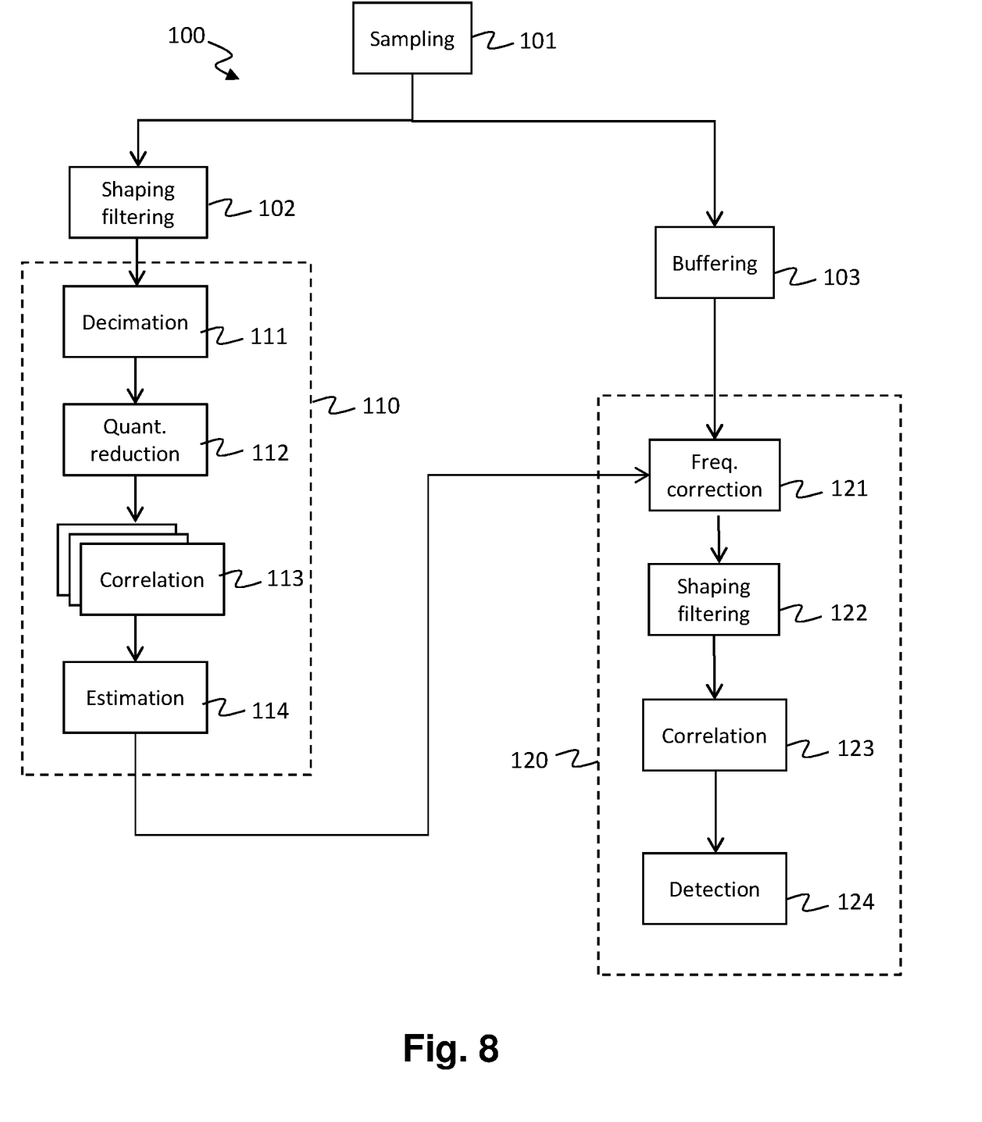

FIG. 8 describes the main steps of a particular mode of implementation of the method 100 according to the invention corresponding to the particular embodiment described in FIG. 7. In particular, the buffering 103 of the samples takes place at the output of the sampling step 101 (and not at the output of the shaping filtering step 102), and a step of shaping filtering 122 the samples obtained at the output of the frequency correction 121 is added. Otherwise, the particular embodiment of the receiver device 10 described with reference to FIG. 8 is similar to that described with reference to FIG. 6.

The description hereinabove clearly illustrates that, by its different features and their advantages, the present invention achieves the set objectives. In particular, the reception chain described with reference to FIG. 2 has a hardware complexity reduced by at least a factor of ten, and possibly a factor of one hundred, compared to a conventional architecture. When the invention is implemented in the form of an FPGA, PLD or ASIC, an implementation of the CORDIC or "ROM based" type allows making the frequency corrections in an efficient manner. These implementations could be coupled with correlation kernels which could also exploit TDM type techniques.

More generally, it should be noted that the modes of implementation and embodiments considered hereinabove have been described as non-limiting examples, and that other variants could consequently be considered.

In particular, different methods considered to be known to a person skilled in the art could be considered for each of the different steps of the method 100 according to the invention. The invention differs mainly by the way in which these different steps are arranged. Thus, different methods could be considered for the sampling step 101, the shaping filtering step 102, the decimation step 111, the quantisation reduction step 112, and the correlation steps 113 and 123. The selection of a particular method for either one of these steps forms only a variant of the invention.

Also, different methods may be considered to define the number and the values of the frequency hypotheses according to the radio conditions in which the invention is applied, or else to define the value of the detection threshold of a candidate first sample for the start of a frame. Herein again, the selection of a particular method forms only a variant of the invention.

The invention has been mainly described in the context of satellite communications. However, it should be noted that the invention could also apply to other types of communications, in particular communications exchanged between a ground station and an aircraft, or between two aircraft, or between an aircraft and a satellite.

The invention claimed is:

1. A method for detecting a start of a frame of a communication signal, said frame including a preamble corresponding to a predetermined sequence of binary symbols, said method including:
    sampling of the signal,
    shape filtering of samples obtained directly at an output of the sampling,
    a first phase for estimating an approximate frequency error of the signal and a candidate first sample for the start of the frame, said first phase including:
    for each of a plurality of predetermined frequency hypotheses:
        calculating a correlation between the samples obtained after the shape filtering and at least one portion of the preamble, and
        estimating on the one hand a candidate first sample for the start of the frame corresponding to one of the samples for which a best correlation value is obtained among the predetermined frequency hypothesis which is higher than a predetermined threshold and, on the other hand, of an approximate frequency error from the predetermined frequency hypotheses having provided the best correlation value,
    buffering of the samples obtained at the output of the sampling or at the output of the shape filtering in a buffer memory while the first phase is executed,
    a second phase for accurately estimating a final candidate sample for the start of the frame, said second phase including:
    applying a frequency correction to the samples obtained at the output of the buffer memory, said frequency correction being determined from the approximate frequency error estimated at the first phase,
    performing a correlation between the corrected samples and the preamble for a limited set of samples comprising the candidate first sample,
    determining the final candidate sample for the start of the frame as the sample for which the best correlation value is obtained.

2. The method according to claim 1, wherein the first phase further includes decimating the samples obtained at the output of the shape filtering, before performing the correlations for the predetermined frequency hypotheses.

3. The method according to claim 1, wherein the buffering of the samples is performed at the output of the shaping filtering.

4. The method according to claim 1, wherein the buffering of the samples is performed at the output of the sampling and the second phase further includes shape filtering of the samples obtained at an output of the frequency correction.

5. The method according to claim 1, wherein the correlations performed during the first phase are carried out on only one portion of the preamble.

6. The method according to claim 1, wherein the first phase further includes reducing a quantisation size of the samples obtained after the shape filtering, before performing the correlations.

7. The method according to claim 1, wherein the number and the values of the predetermined frequency hypotheses are predetermined as a function of an estimated signal-to-noise ratio, a desired maximum frame error rate, and a considered maximum frequency error.

8. The method according to claim 1, wherein the correlation performed during the second phase includes performing a first correlation on a first portion of the preamble and performing a second correlation on a second portion of the preamble, a final correlation value being calculated as a function of the correlation values obtained respectively for the first correlation and for the second correlation.

9. The method according to claim 1, wherein the second phase further includes estimating a fractional delay to be added or subtracted from a time point of the final candidate sample to determine the start of the frame, said fractional delay corresponding to a fraction of the sampling period.

10. The method according to claim 1, wherein the frame includes a sequence of bits corresponding to the preamble and a sequence of bits corresponding to payload data, the sequence of the preamble bits being modulated by a BPSK modulation, the sequence of payload data bits being modulated by a higher-order modulation for which a modulation symbol encodes at least two bits.

11. A computer-readable storage medium including a set of program code instructions which, when executed by a processor, configure said processor to implement a method for detecting the start of a frame of a communication signal according to claim 1.

12. A receiver device for detecting a start of a frame of a communication signal, said frame including a preamble corresponding to a predetermined sequence of binary symbols, the receiver device including a processing circuit and a buffer memory, wherein the processing circuit is configured to:

sample the communication signal, apply a shape filter to filter samples of the communication signal obtained directly from the step of sampling the communication signal, apply correlations, each respectively associated with a different frequency hypothesis, to the samples of the communication signal after the application of the shape filter, and for each of the applications of the correlations calculate a correlation with at least one portion of the preamble, estimate a candidate first sample for the start of the frame corresponding to at least one of the samples of the communication signal for which a best correlation value is obtained among the application of the correlations of the different frequency hypotheses, wherein the best correlation value is higher than a predetermined threshold, estimate an approximate frequency error from the frequency hypothesis having provided the best correlation value, temporarily record in the buffer memory the samples of the communication signal obtained directly from the step of sampling or after the application of the shape filter, apply a frequency correction to the samples of the communication signal recorded in the buffer memory, wherein the frequency correction is determined from the estimated approximate frequency error to create a limited set of corrected samples, correlate the preamble with each sample of the limited set of corrected samples, and, identify a final candidate sample for the start of the frame corresponding to the sample of the limited set of corrected samples for which a best correlation value is obtained.

13. The receiver device according to claim 12, wherein the processing circuit is further configured to decimate the samples of the communication signal after the application of the shape filter before the step of the correlations.

14. The receiver device according to claim 12, wherein the buffer memory temporally records the samples of the communication signal obtained after application of the shape filter.

15. The receiver device according to claim 12, wherein the buffer memory temporally records the samples of the communication signal directly from the step of sampling the communication signal.

16. The receiver device according to claim 12, wherein the application of the correlations perform the correlations on only a portion of the preamble.

17. The receiver device according to claim 12, wherein the processing circuit is further configured to reduce a quantisation size of the samples obtained after the application of the shape filter.

18. The receiver device according to claim 12, wherein the correlations include:

a first correlation calculation on a first portion of the preamble, a second correlation calculation on a second portion of the preamble, and a final correlation value calculated as a function of correlation values obtained respectively for the first correlation calculation and the second correlation calculation.

19. A satellite or aircraft including a receiver device according to claim 12.

20. A ground station including a receiver device according to claim 12.

* * * * *